United States Patent
Lu et al.

(10) Patent No.: US 9,548,990 B2
(45) Date of Patent: *Jan. 17, 2017

(54) DETECTING A HEAP SPRAY ATTACK

(71) Applicant: Palo Alto Networks, Inc., Santa Clara, CA (US)

(72) Inventors: ChienHua Lu, Santa Clara, CA (US); Bo Qu, Fremont, CA (US); Kyle Sanders, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,104

(22) Filed: Oct. 26, 2015

(65) Prior Publication Data

US 2016/0112446 A1  Apr. 21, 2016

Related U.S. Application Data

(63) Continuation of application No. 14/301,965, filed on Jun. 11, 2014, now Pat. No. 9,202,054, which is a continuation-in-part of application No. 13/951,316, filed on Jul. 25, 2013, now Pat. No. 9,336,386.

(60) Provisional application No. 61/834,364, filed on Jun. 12, 2013.

(51) Int. Cl.
*H04L 29/06* (2006.01)
*G06F 21/56* (2013.01)
*G06F 21/55* (2013.01)
*G06F 21/52* (2013.01)

(52) U.S. Cl.
CPC .......... *H04L 63/1416* (2013.01); *G06F 21/52* (2013.01); *G06F 21/55* (2013.01); *G06F 21/566* (2013.01)

(58) Field of Classification Search
CPC ................................................... H04L 63/1416
See application file for complete search history.

(56) References Cited

U.S. PATENT DOCUMENTS

| 8,353,033 B1* | 1/2013 | Chen | G06F 21/51 713/164 |
|---|---|---|---|
| 2003/0115485 A1* | 6/2003 | Milliken | G06F 21/562 726/24 |
| 2010/0205674 A1* | 8/2010 | Zorn | G06F 21/556 726/25 |
| 2012/0144486 A1* | 6/2012 | Navaraj | G06F 21/52 726/23 |
| 2014/0123283 A1* | 5/2014 | Liu | G06F 21/566 726/23 |

* cited by examiner

*Primary Examiner* — William Powers
*Assistant Examiner* — Thanh Le
(74) *Attorney, Agent, or Firm* — Van Pelt, Yi & James LLP (57) ABSTRACT

Various techniques for exploit detection based on heap spray detection are disclosed. In some embodiments, exploit detection based on heap spray detection includes executing a program in a virtual environment, monitoring a heap of a memory while executing the program in the virtual environment, and detecting a potential heap spray attack based on detecting a burst allocation of a first plurality of blocks in the heap of the memory, in which each of the first plurality of blocks is stored in the predefined address range of the memory.

42 Claims, 6 Drawing Sheets

DETECTING A HEAP SPRAY ATTACK

CROSS REFERENCE TO OTHER APPLICATIONS

This application is a continuation of co-pending U.S. patent application Ser. No. 14/301,965, entitled DETECTING A HEAP SPRAY ATTACK, filed Jun. 11, 2014, which is continuation in part of co-pending U.S. patent application Ser. No. 13/951,316, entitled EXPLOIT DETECTION BASED ON HEAP SPRAY DETECTION, filed Jul. 25, 2013, which claims priority to U.S. Provisional Patent Application No. 61/834,364, entitled EXPLOIT DETECTION BASED ON HEAP SPRAY DETECTION, filed Jun. 12, 2013, all of which are incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, a significant challenge for security detection techniques is to identify threats (e.g., malware, which refers to malicious programs, such as programs attempting to perform malicious or undesired actions) attempting to use new exploits, such as zero-day threats that have not previously been identified. For example, a new zero-day threat that has not previously been identified (e.g., for which no signature yet exists) can exploit new or unresolved vulnerabilities in an application or operation system.

Heap spraying is a technique that can be used in exploits to facilitate arbitrary code execution. In general, this technique attempts to insert a certain sequence of bytes at a predetermined location in the memory of a target process by allocating blocks of memory (e.g., large allocated blocks of memory) on the process's heap and filling the bytes in these blocks with the certain sequence of bytes starting at a predetermined location within the allocated blocks (e.g., NOP (no operation instruction on the target architecture) is used to pre-fill or offset within the block before the start of the certain sequence of bytes).

Although heap spray does not actually exploit any security issues, heap spray techniques can be used by malware to make a security issue easier (e.g., or more reliable) to exploit. Thus, a separate security issue (e.g., exploit) is typically used by a program that performs malicious heap spraying techniques. In particular, heap spraying techniques can be used to leverage the design of most architectures and operating systems such that a start location of a large heap allocation is generally predictable and consecutive allocations are approximately sequential. As a result, in most architectures and operating systems, heap spray techniques can leverage the fact that a sprayed heap will generally be in the same location each and every time the heap spray is executed.

Exploits often use specific bytes to spray the heap, as the data stored on the heap serves multiple roles. During exploitation of a security issue, the application code can often be made to read an address from an arbitrary location in memory. This address is then used by the code as the address of a function to execute. If the exploit can force the application to read this address from the sprayed heap, then the exploit can control the flow of execution when the code uses that address as a function pointer and redirects it to the sprayed heap. If the exploit succeeds in redirecting control flow to the sprayed heap, then the bytes there will be executed, allowing the exploit to perform whatever actions the attacker desires. Therefore, the bytes on the heap are restricted to represent valid addresses within the heap spray itself, holding valid instructions for the target architecture, so the application will not crash. This allows the heap spray to function as a very large NOP sled.

Examples of potentially malicious programs that perform heap spraying techniques include heap sprays for web browsers (e.g., commonly implemented using JavaScript to spray the heap by creating large strings), scripts performed by supported application environments (e.g., VBScript used in the Microsoft® Internet Explorer® browser or ActionScript used in the Adobe Flash® application), image-based heap spraying techniques, heap spraying techniques using HTML5, and/or various other techniques that can be used to perform various heap spraying techniques.

Thus, what are needed are new and improved techniques for exploit detection based on heap spray detection. Accordingly, various techniques for exploit detection based on heap spray detection are disclosed.

In some embodiments, exploit detection based on heap spray detection includes exploit detection by detecting heap spray in memory. For example, heap spray is a common technique used in modern exploits as discussed generally above. In some embodiments, various heuristic techniques for detecting a memory allocation pattern are disclosed to detect heap spray in memory as further described below.

In some embodiments, exploit detection based on heap spray detection includes exploit detection by changing execution environments. For example, most modern exploits attempt to target multiple versions and/or platforms (e.g., checking such environments and then constructing the environment for exploiting). In some embodiments, various techniques for detecting such exploits are provided by implementing various modifications of the execution environment (e.g., changing a binary file version, changing a binary file base address, and/or replacing a binary file with an older version of that file) as further described below with respect to various embodiments. As a result, using such execution environment modification techniques, such exploits can fail, because the execution environment is altered thereby hindering or disrupting the desired execution environment required by the malicious heap spraying program. For example, a predefined address of an ROP gadget (e.g., Return Oriented Programming (ROP) based exploits) would no longer exist. As a result, these techniques can effectively differentiate normal program behaviors from malicious program behaviors, because normal operation would be processed while an attempted exploitation would generally crash the program. Furthermore, an attempted exploitation can be detected by scanning memory as an indication of an attack. For example, scanning memory can including identifying ROP gadgets or a de-obfuscated PE image in memory.

For example, such heap spray detection techniques can provide effective security detection techniques, because these techniques can detect various exploits (e.g., even the exploits that do not succeed). As another example, heap spraying detection techniques using a modification of the execution environment can efficiently differentiate normal, non-malicious program behaviors from suspicious, malicious behaviors, because normal operations generally would be processed while attempted exploitations would typically crash the program in these modified execution environments. Furthermore, the various heap spraying detection techniques disclosed herein generally result in less false positives and, thus, are more effective than other approaches. These and other examples are further described herein with respect to various embodiments.

In some embodiments, various techniques for exploit detection based on heap spray detection are disclosed. In some embodiments, exploit detection based on heap spray detection includes executing a program in a virtual environment, and detecting heap spray in memory while executing the program in the virtual environment. In some embodiments, the heap spray is detected based on a comparison (e.g., based on a threshold comparison) of each of a plurality of allocated blocks in memory. In some embodiments, the heap spray is determined to be malicious.

In some embodiments, exploit detection based on heap spray detection further includes receiving the program from a security device, in which the program corresponds to a malware sample (e.g., a potentially malicious code sample) that is monitored during execution in the virtual environment to determine whether the program indicates potentially malicious heap spray-related behavior.

In some embodiments, exploit detection based on heap spray detection further includes determining if the program is performing malicious heap spray in memory by comparing each of a plurality of allocated blocks in memory.

In some embodiments, exploit detection based on heap spray detection further includes calculating a hash of each of a plurality of allocated blocks in memory; and determining if the program is performing malicious heap spray in memory.

In some embodiments, exploit detection based on heap spray detection further includes selecting a subset of each of a plurality of allocated blocks (e.g., a range that is based on a subset of each of the allocated blocks) for a hash calculation; calculating a hash of the selected subset of each of the plurality of allocated blocks in memory; and determining if the program is performing malicious heap spray in memory based on a comparison (e.g., a threshold comparison) of each hash of each of the plurality of allocated blocks in memory.

In some embodiments, exploit detection based on heap spray detection includes executing a program in a virtual environment, and detecting heap spray related malware in response to a modification of an execution environment in the virtual environment. In some embodiments, the heap spray is detected based on one or more of the following modifications of the execution environment: a change in a binary file version, a change in a binary file base address, and a replacement of a binary file with an older version of the binary file.

In some embodiments, exploit detection based on heap spray includes monitoring allocated memory for certain artifacts of exploitation (e.g., a de-obfuscated executable or beacon location).

Accordingly, various techniques for exploit detection based on heap spray detection are disclosed. As will be apparent to one skilled in the art in view of the various techniques and embodiments described herein, while the various techniques described herein for exploit detection based on heap spray detection are described with respect to virtual environments using a security service (e.g., a cloud security service), such techniques can similarly be applied to various other security environments, including, for example, performed in part or completely using security devices such as appliances, gateways, servers, and/or other security platforms capable of implementing various virtual environment techniques disclosed herein.

Figure 1:
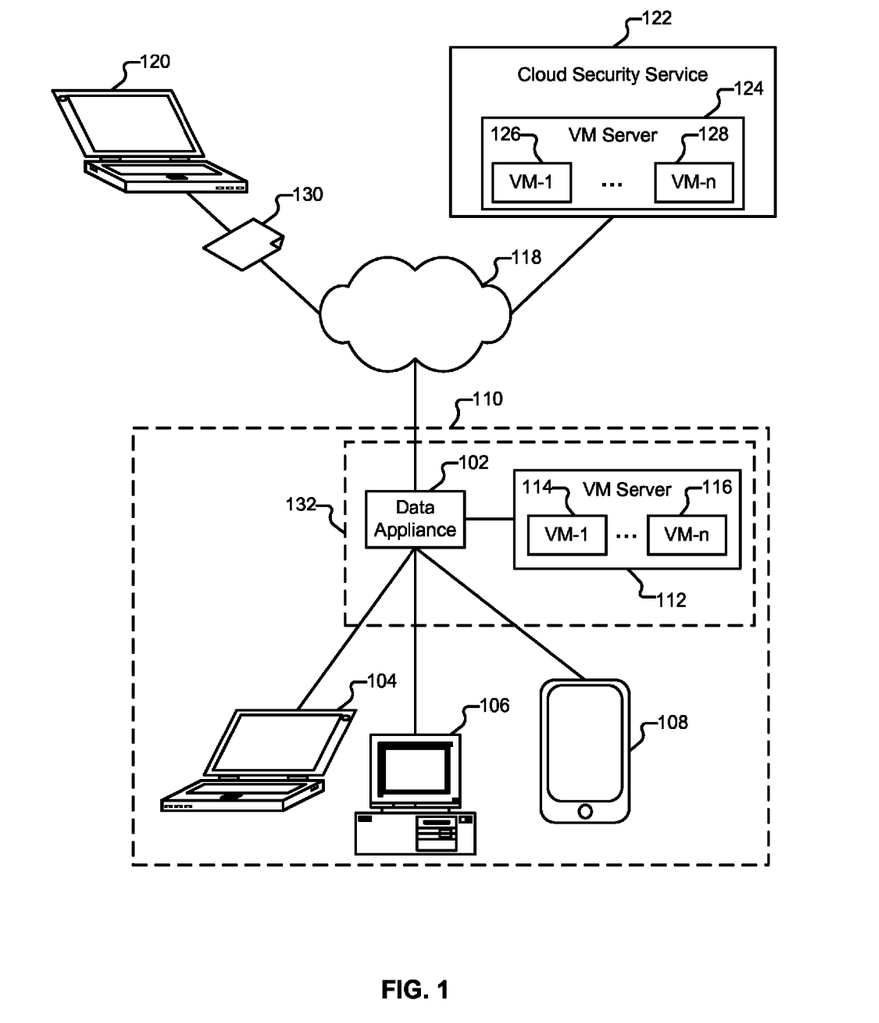
FIG. 1 is a functional diagram of an architecture for providing exploit detection based on heap spray detection in accordance with some embodiments.

FIG. 1 is a functional diagram of an architecture for providing exploit detection based on heap spray detection in accordance with some embodiments. For example, such an environment can detect and prevent malware (e.g., malware that performs malicious heap spraying techniques) from causing harm. In particular, a variety of attempts by a malicious individual to propagate malware (e.g., malware 130) via system 120 are described, as are techniques for thwarting that propagation.

In the example shown in FIG. 1, client devices 104, 106, and 108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

As will be described in more detail below, appliance 102 can be configured to work in cooperation with one or more virtual machine servers (112, 124) to perform malware analysis/prevention, including various techniques for exploit detection based on heap spray detection as disclosed herein. As one example, data appliance 102 can be configured to provide a copy of malware 130 to one or more of the virtual machine servers for real-time analysis. As another example, a cloud security service 122 can provide a list of signatures of known-malicious documents to appliance 102 as part of a subscription. Those signatures can be generated by service 122 in conjunction with the techniques described herein. For example, if service 122 identifies a new malware associated with the malware sample received from a data appliance (e.g., data appliance 102 or another data appliance), such as using various techniques for exploit detection based on heap spray detection as disclosed herein, service 122 can automatically generate a new signature for the newly identified malware and send the new signature to various subscribers (e.g., data appliance 102 and various other data appliances that receive subscription-based signature updates).

An example of a virtual machine server is a physical machine comprising commercially available server-class hardware (e.g., a multi-core processor such as a dual 6-core Intel® processor with Hyper-Threading, 4 or more Gigabytes of RAM such as a 128 GB RAM, a system disk such as a 120 GB SSD, and one or more Gigabit network interface adapters) that runs commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not shown).

In some embodiments, the virtual machine server 124 is configured to implement various emulation-based techniques for exploit detection based on heap spray detection as described herein with respect to various embodiments (e.g., implemented using a heap spray detection engine, which is executed by cloud security service 122 and/or malware analysis system 132, that uses an instrumented emulation environment to perform various emulation-based techniques for exploit detection based on heap spray detection, such as described below with respect to FIGS. 3-6 and with respect to various other embodiments disclosed herein). For example, the virtual machine server 124 can provide an instrumented emulation environment capable of performing the various techniques as described herein. These instrumented VM environments 126 and 128 can include, for example, various user level hooks and/or kernel level hooks in the emulated execution environment to facilitate the monitoring of the program behavior during execution in the virtual environment (e.g., instrumented VM environments, such as described above) and to log such monitored program behaviors for analysis based on the various techniques described herein with respect to various embodiments. Also, in some cases, multiple instances of a malware sample can be performed using multiple VM environments to perform various tests and/or execute using different execution environments (e.g., different versions of an operating system (OS) environment, different versions of an application, etc.).

Figure 2:
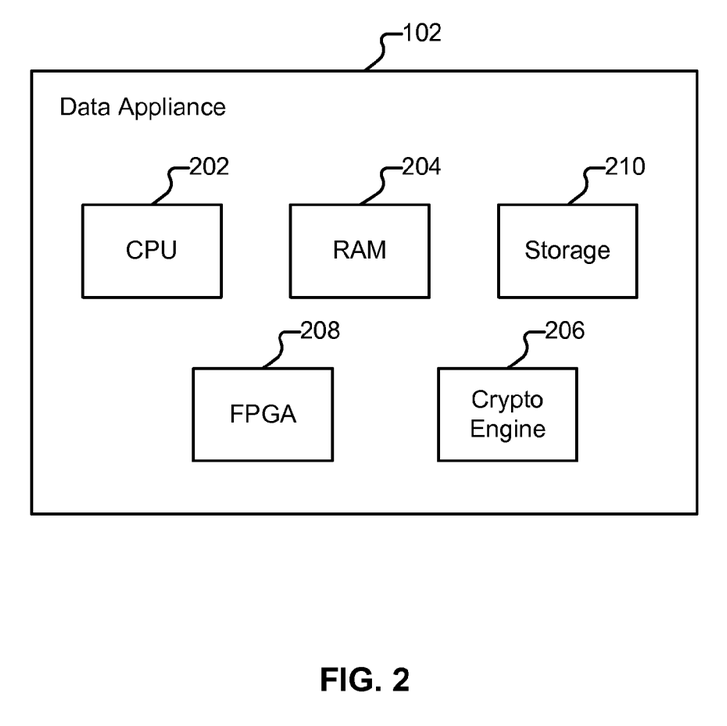
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy and other configuration information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Detect Heap Spraying in Memory

A virtual machine (VM) can be used to perform behavior profiling (e.g., in a VM sandbox environment) using various heuristic-based analysis techniques that can be performed in real-time during execution of the program in the virtual environment. As one example, suppose a malicious user of system 120 sends an email message to a user of client 104 that includes a suspicious or malicious attachment. The attachment may be an executable (e.g., having a file extension of, for example, .exe or .js or some other executable related file extension) and may also be a document (e.g., having a file extension of, for example, .doc or .pdf or some other document related file extension). The message is received by data appliance 102, which determines whether a signature for the attachment is present on data appliance 102. A signature, if present, can indicate that the attachment is known to be safe, and can also indicate that the attachment is known to be malicious. If no signature for the attachment is found, data appliance 102 is configured to provide the attachment to a virtual machine server, such as virtual machine server 112, for analysis, such as using various techniques for exploit detection based on heap spray detection, such as described herein with respect to various embodiments.

Virtual machine server 112 is configured to execute (or open, as applicable) the attachment in one or more virtual machines, such as virtual machines 114 and 116. The virtual machines may all execute the same operating system (e.g., Microsoft Windows) or may execute different operating systems or versions thereof (e.g., with VM 116 emulating an Android operating system or some other operating system). In some embodiments, the VM(s) chosen to analyze the attachment are selected to match the operating system of the intended recipient of the attachment being analyzed (e.g., the operating system of client 104). Observed behaviors resulting from executing/opening the attachment (e.g., to analyze the memory to detect heap spraying) are logged and analyzed for indications that the attachment is potentially malicious or malicious. In some embodiments, the VM(s) chosen to analyze the attachment are selected to modify the execution environment, such as to use a different version of the operating environment or to use various techniques for heap spray detection based on a modified execution environment, such as described herein with respect to various embodiments. In some embodiments, such VM-based analysis techniques are performed by the VM server (e.g., VM server 112). In other embodiments, such VM-based analysis techniques are performed at least in part by appliance 102 (e.g., or in some cases, such VM-based analysis techniques can be performed completely by the appliance 102). The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable.

If the malware sample (e.g., attachment) is determined to be malicious, appliance 102 can automatically block the file download based on the analysis result. Further, in some embodiments, a signature can be generated and distributed (e.g., to other data appliances) to automatically block future file transfer requests to download the file determined to be malicious.

A variety of techniques for detecting heap spray will be described in conjunction with FIG. 3.

Figure 3:
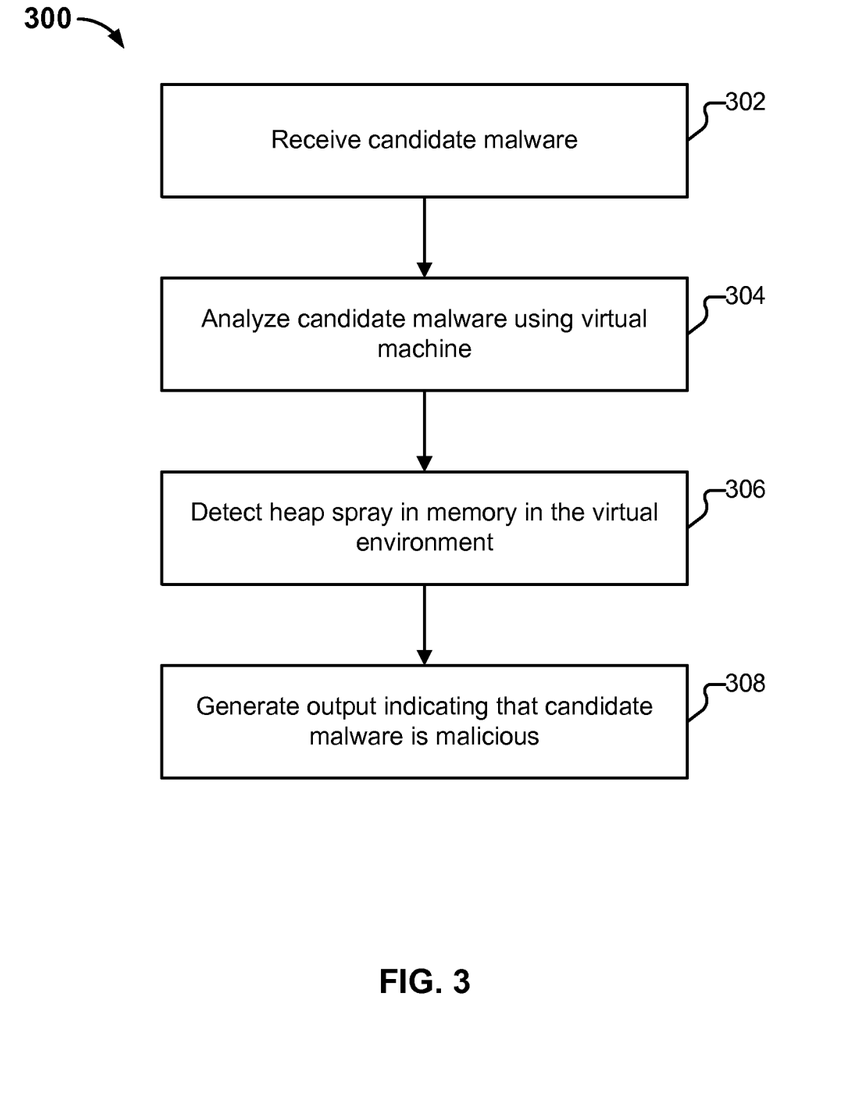
FIG. 3 is a flow diagram of a process for providing exploit detection based on heap spray detection in accordance with some embodiments.

FIG. 3 is a flow diagram of a process for providing exploit detection based on heap spray detection in accordance with some embodiments. In various embodiments, process 300 is performed by malware analysis system 132. The process begins at 302 when candidate malware (e.g., a malware sample) is received. As one example, candidate malware is received at 302 when an email (e.g., including an attachment) is received by data appliance 102 from system 120. As another example, data appliance 102 can be configured to transmit the attachment to service 122 for analysis. In that scenario, the candidate malware is received by cloud security service 122 at 302.

At 304, the candidate malware is analyzed using one or more virtual machines by executing a program in a virtual environment. For example, the candidate malware can be executed in one or more virtual machines 114-116 and any behaviors logged for analysis by system 132. As another example, the candidate malware can be executed in one or more virtual machines 126-128 and analyzed by cloud security service 122.

In some embodiments, various heuristic techniques are used to detect whether the file or program (e.g., malware sample can include a file, which can be opened using an appropriate application, and/or a program) executing in the virtual environment is performing heap spraying in memory. For example, each newly allocated block in memory can be examined to determine whether or not the file or program is performing heap spraying. In some cases, each newly allocated block of memory can be hashed (e.g., using a hash algorithm, such as MD5 or another hash algorithm), and the hash values of multiple allocated blocks of the memory can be compared to determine whether or not such match (e.g., based on a threshold comparison, such as determining that at least a certain percentage of the allocated blocks of memory match based on the comparison), thereby indicating heap spraying behavior. In some cases, a subset of the allocated blocks of memory is used for the hash calculation. In some cases, multiple hash calculations are performed using different subset selections of the allocated blocks of memory (e.g., to detect heap spraying in which a first portion of allocated blocks may be written with NOPs (no operation instructions on the target architecture) by the program attempting to spray the heap). In some cases, each time a new block of memory is allocated, the process of calculating hash values against each allocated block (e.g., or subset thereof) is performed again, and the hash value results of each allocated block are again compared (e.g., using a threshold comparison) to determine if heap spraying behavior is detected.

At 306, a determination is made as to whether the file or program is performing heap spraying in memory while executing the file or program in the virtual environment. And, if so, at 308, output is generated that indicates that the candidate malware is malicious. As one example, at 308, a signature for the attachment can also be generated (e.g., as an MD5 hash-based signature). As another example, instead of or in addition to generating a signature, an alert can be generated that instructs data appliance 102 not to provide the attachment to client 104.

Using Virtual Machines to Detect Heap Spray by Modifying an Execution Environment A variety of techniques for detecting heap spray by modifying an execution environment will be described in conjunction with FIG. 4.

Figure 4:
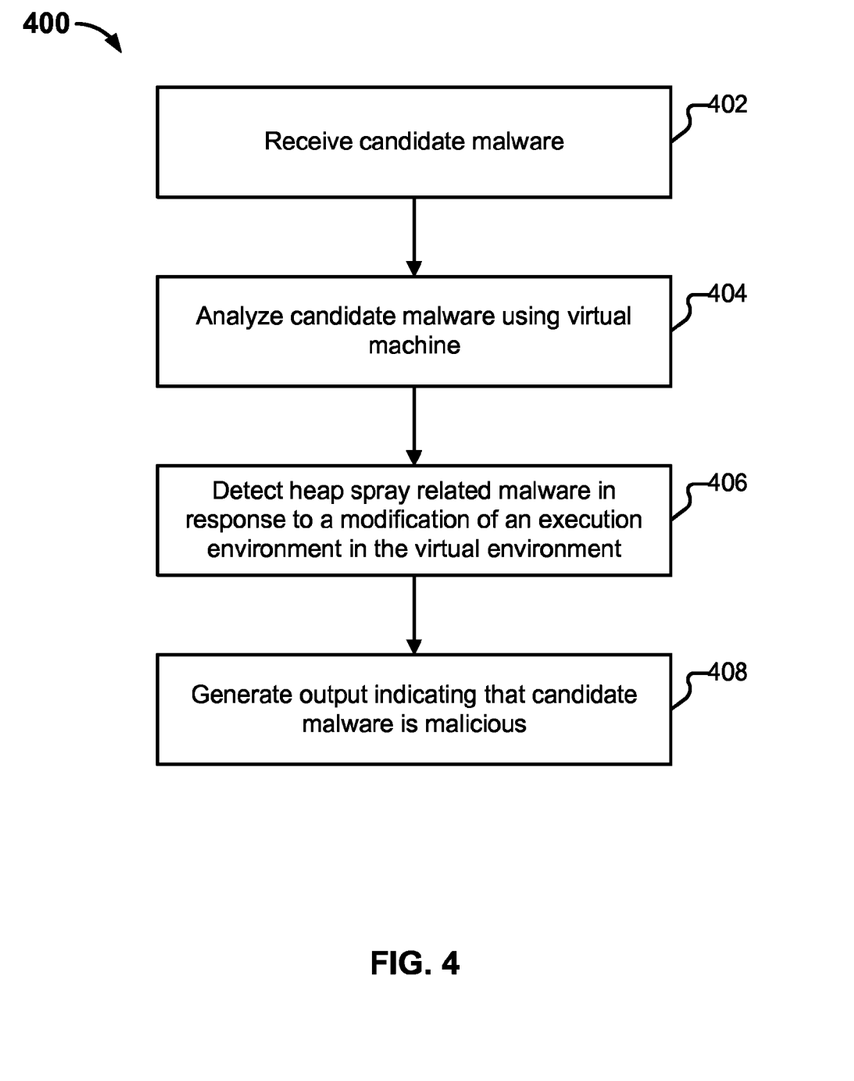
FIG. 4 is another flow diagram of a process for providing exploit detection based on heap spray detection in accordance with some embodiments.

FIG. 4 is another flow diagram of a process for providing exploit detection based on heap spray detection in accordance with some embodiments. In various embodiments, process 400 is performed by malware analysis system 132. The process begins at 402 when candidate malware (e.g., a malware sample) is received. As one example, candidate malware is received at 402 when an email (e.g., including an attachment) is received by data appliance 102 from system 120. As another example, data appliance 102 can be configured to transmit the attachment to service 122 for analysis. In that scenario, the candidate malware is received by cloud security service 122 at 402.

At 404, the candidate malware is analyzed using one or more virtual machines by executing a file or program (e.g., malware sample can include a file, which can be opened using an appropriate application, and/or a program) in a virtual environment. For example, the candidate malware can be executed in one or more virtual machines 114-116 and any behaviors logged for analysis by system 132. As another example, the candidate malware can be executed in one or more virtual machines 126-128 and analyzed by cloud security service 122.

In particular, in accordance with some embodiments, an aspect of the virtual environment is modified to provide a modified execution environment. For example, a binary file version can be changed (e.g., changing an Adobe Flash version from version 11.1.115.36 to version 11.1.115.34). As another example, binary file base addresses can be changed (e.g., changing the base address of hxds.dll from 0x51bd0000 to 0x51bc0000). This causes exploits that rely on this specific address to crash, because the expected values will be different. As yet another example, a binary file can be replaced with an older version (e.g., msvcr100.dll). As similarly discussed above, the values in the newer version of the dll will be different and exploits rely on very specific values. By changing the execution environment, heap spraying being performed by the candidate malware can be detected at 406, because the candidate malware can fail to execute in the modified execution environment.

At 406, a determination is made as to whether the program is performing heap spraying in memory by detecting heap spray related malware in response to a modification of an execution environment in the virtual environment. And, if so, at 408, output is generated that indicates that the candidate malware is malicious. As one example, at 408, a signature for the attachment can also be generated (e.g., as an MD5 hash-based signature). As another example, instead of or in addition to generating a signature, an alert can be generated that instructs data appliance 102 not to provide the attachment to client 104.

Detecting a Potential Heap Spray Attack

Various heuristic techniques that can be used to detect whether the program (e.g., malware sample) executing in the virtual environment is performing heap spraying in memory can be expensive in terms of time and computing resources used by such heuristic analysis techniques performed in the virtual environment.

Thus, what are needed are additional techniques for determining whether or when to perform such various heuristic techniques for heap spray detection to improve performance for providing exploit detection based on heap spray detection.

Accordingly, various techniques for detecting a potential heap spray attack are disclosed. For example, techniques for detecting a potential heap spray attack (e.g., including various additional heuristic techniques, which are generally lightweight techniques that are more cost-efficient, as further described below) can be used to determine whether or when to proceed with performing the various heuristic techniques for heap spray detection (e.g., including the various heuristic techniques described above, such as with respect to 304 of FIG. 3) that can be used to detect whether the program (e.g., an executable malware sample or an application executing in the virtual environment in which that application loads a file that is the malware sample) executing in the virtual environment is performing heap spraying. Specifically, prior to examining each newly allocated block in memory (e.g., by hashing each allocated block and/or hashing a subset of each allocated block) to determine whether or not the file or program is performing heap spraying, such as discussed above with respect to 304 of FIG. 3, these techniques for detecting a potential heap spray attack can be performed to determine whether or not to proceed to such additional heuristic techniques. Additional performance improvements are also described below. As a result, applying these additional techniques for detecting a potential heap spray attack as further described below can provide a more efficient approach to exploit detection based on heap spray detection by detecting heap spray in memory.

For example, the above-described techniques for exploit detection based on heap spray detection by detecting heap spray in memory can be more efficiently performed. In particular, performing the above-described various heuristic techniques for detecting a memory allocation pattern to detect heap spray in memory can be costly to perform (e.g., based on processor usage and processing time costs associated with performing such heuristic techniques). Thus, a more efficient approach for performing exploit detection based on heap spray detection by first detecting a potential heap spray in memory is disclosed below.

In some embodiments, by performing various heuristic techniques for detecting a potential heap spray attack as a first stage of analysis (e.g., of a malware sample executed in a virtual environment, such as described above with respect to FIGS. 1 and 2), as further disclosed below, the above-described various heuristic techniques for detecting a memory allocation pattern to detect heap spray in memory as described above (e.g., including the heuristic techniques discussed above at 304 of FIG. 3) can then be performed as a second stage of analysis if the below-described techniques detect a potential heap spray attack during the first stage of analysis. As a result, by performing such a two-stage approach as a technique for detecting a heap spray attack, overall performance for heap spray detection is improved as the more expensive techniques for performing the above-described various heuristic techniques for detecting a memory allocation pattern to detect heap spray in memory (e.g., the second stage of analysis) need not be performed unless the below-described heuristic techniques for detecting a potential heap spray attack are first performed (e.g., the first stage of analysis) such that results of the first stage of analysis can be used to determine whether or when to proceed with performing the second stage of analysis of this approach as further discussed below. Various other performance improvements and additional heuristic techniques are also discussed below.

Accordingly, various additional techniques for exploit detection based on heap spray detection are disclosed. In some embodiments, exploit detection based on heap spray detection includes executing a program in a virtual environment, monitoring a heap of a memory while executing the program in the virtual environment, and detecting a potential heap spray attack based on detecting a burst allocation of a first plurality of blocks in the heap of the memory, in which each of the first plurality of blocks is stored in the predefined address range of the memory.

For example, one or more additional criteria can be used with these heuristic techniques to detect a potential heap spray attack (e.g., as a first stage of analysis) as further discussed below. In one embodiment, the burst allocation of the first plurality of blocks in the heap of the memory exceeds a threshold size within a predetermined period of time. In one embodiment, the first plurality of blocks exceeds a threshold number of blocks, and the burst allocation of the first plurality of blocks in the heap of the memory is detected within a predetermined period of time. In one embodiment, each of the first plurality of blocks is of at least a threshold block size. In one embodiment, an allocated block size of each of the first plurality of blocks is identical, and each of the first plurality of blocks is of at least a threshold block size.

In some embodiments, if a potential heap spray attack is detected, then various heuristic techniques can then be used to verify whether the malware sample is performing heap spraying behavior (e.g., such as by using the various heuristic techniques as similarly discussed above with respect to 304 of FIG. 3). In one embodiment, the heap spray in memory is detected based on a comparison of each of a second plurality of blocks allocated in the memory (e.g., these second plurality of blocks allocated in memory can be a different set of allocated blocks in the memory than the first set of allocated blocks), and each of the second plurality of blocks is stored in the predefined address range of the memory. In one embodiment, the heap spray in memory is detected based on a comparison of each of a second plurality of blocks allocated in the memory, in which each of the second plurality of blocks is stored in the predefined address range of the memory, and in which the heap spray is determined to be malicious. In one embodiment, exploit detection based on heap spray detection further includes detecting heap spray in memory by calculating a hash of each of a second plurality of blocks allocated in the heap of the memory, in which each of the second plurality of blocks is stored in the predefined address range of the memory.

In one embodiment, exploit detection based on heap spray detection further includes calculating a hash of each of a second plurality of blocks allocated in the heap of the memory, in which each of the second plurality of blocks is stored in the predefined address range of the memory, comparing the hash of each of the second plurality of blocks, and if the comparing of the hash of each of the second plurality of blocks does not indicate that contents of each of the second plurality of blocks satisfies a threshold match (e.g., to determine whether the contents of each of these allocated blocks is identical or within a threshold match), then selecting a third plurality of blocks in the heap of the memory to repeat a sliding window analysis for detecting heap spraying behavior, in which each of the third plurality of blocks is stored in the predefined address range of the memory. For example, a first set of a number of allocated blocks (e.g., five allocated blocks or some other number of allocated blocks) within the predefined address range can be examined using these techniques, and if the examination of the first set of allocated blocks does not result in a determination of heap spraying behavior, then a next set of allocated blocks can be examined (e.g., sequentially selecting the next set of five allocated blocks or some other number of allocated blocks, from lower address to higher address in the memory, which provides such a sliding window analysis approach).

In one embodiment, exploit detection based on heap spray detection further includes receiving the program at a security cloud service from a security device, in which the program corresponds to a malware sample that is monitored during execution in the virtual environment to determine whether the program indicates potentially malicious heap spray related behavior.

For example, techniques for detecting a potential heap spray attack can be implemented as a first stage of analysis by monitoring a memory that includes a predefined address range while executing a program in a virtual environment (e.g., opening a file using an appropriate application based on the file type, such as Adobe Acrobat® can be used to open a PDF document, Microsoft Word® can be used to open a Word document, etc.). In an example implementation, the predefined address range can include an address range such as 0X0X0000 to 0d0d0000, 8080808 to 0C0C0C0C0C, 0x0a040a04 to 0x20302020 (e.g., such as for a JavaScript file type), and/or other predefined address ranges (e.g., larger or smaller address ranges), which can be used for implementing these additional heuristic techniques for detecting a potential heap spray attack. In some implementations, different address ranges can be selected and/or different threshold values can be selected based on file types or executables of the malware sample being monitored in the virtual environment. In some cases, predefined address ranges can be selected based on monitoring a number of samples of different file types to determine various address ranges that include predictable addresses that are observed to be targeted by malware in various heap spray attacks, such as 0x09090909, 0x0C0C0C0C, 0C1234, or other targeted addresses, such as a higher or lower address in memory. Various file types can be monitored using the techniques described herein, such as JavaScript (.js), PDF (.pdf), Word documents (.doc), VBScript (.vbs), and or other file formats/types that can utilize heap spray attacks.

In particular, because the address of the malicious code is not generally predictable, an attacker will typically spray a large amount of NOPs followed by malicious code on the heap of the memory until desired predictable addresses are covered so that hijacked control flow can have a higher success rate in landing on the malicious code in the heap of the memory. As a result, monitoring the heap in memory for such predictable addresses used by heap spray attacks provides an effective mechanism to detect a potential heap spray attack.

For example, a potential heap spray attack can be detected based on detecting a burst allocation of a plurality of blocks in the heap of the memory, in which the plurality of blocks are stored in the predefined address range of the memory. In an example implementation, the detected allocation of the plurality of blocks can be triggered only if the burst allocation is of at least a threshold size, in which the threshold size can be selected to be a size that exceeds a typical heap allocation used for the application being emulated in the VM, such as 50 MB (e.g., which exceeds the typical heap allocation used by Adobe Acrobat® for opening a PDF document), 80 MB (e.g., which exceeds the typical heap allocation used by Adobe Flash Player® for opening an ActionScript file), and/or other heap size thresholds (e.g., which can be selected in some implementations based on file types or executables of the malware sample being monitored in the virtual environment). As further discussed below, various other additional criteria can be used with the heuristic techniques for detecting a potential heap spray attack.

In an example implementation, the monitoring of the heap of the memory can further including determining whether a burst allocation of a plurality of blocks in the heap of the memory occurs within a predetermined period of time (e.g., which can be selected based on monitoring a number of samples of different file types to determine timing of such monitored burst allocations used in various heap spray attacks, and which can depend on the computing hardware and software environment used for such monitoring in the virtual environment).

As such, using this additional technique for detecting a potential heap spray attack can be implemented as a first stage of analysis to provide a more efficient approach such that the above-described techniques for exploit detection based on heap spray detection (e.g., such as described above with respect to 304 of FIG. 3) can then be performed as a second stage of analysis only if a burst allocation is detected in the heap of the memory in the predefined address range during the first stage of analysis (e.g., and, in some cases, for a burst allocation that exceeds a threshold size and/or for a burst allocation within a predetermined period of time). Thus, this approach of using a first stage of analysis for detecting a potential heap spray attack can be used as a condition precedent to whether and/or when to apply the above-described heuristic heap spray techniques (e.g., such as described above with respect to 304 of FIG. 3) as a second stage of analysis to verify whether the malware sample is performing heap spraying behavior.

As an example, if a potential heap spray attack is detected during such a first stage of analysis for detecting a potential heap spray attack, then a second stage can be performed to verify whether the malware sample being monitored during execution in the virtual environment (e.g., an instrumented VM environment, such as described above with respect to FIG. 1) is actually performing heap spraying in memory. In an example implementation, the second stage can include performing the above-described heuristic heap spray detection techniques (e.g., such as described above with respect to 304 of FIG. 3). In particular, in some embodiments, various heuristic techniques, such as similarly described above with respect to 304 of FIG. 3, are used to detect whether a malware sample (e.g., a malware sample can include a file, which can be opened using an appropriate application, and/or an executable program) executing in the virtual environment is performing heap spraying in memory. For example, if a burst allocation monitored during the first stage of analysis triggers the potential heap spray detection during this first stage of analysis, then the second stage of analysis can be performed only for those allocated blocks that are within the predefined address range (e.g., or in some implementations, only for allocated blocks that span one or more predefined addresses in memory), as opposed to performing this second stage of analysis for each allocated block in the heap of the memory, in order to determine whether or not the malware sample is performing heap spraying in memory. In some cases, each of such allocated blocks selected for examination during the second stage of analysis can be hashed (e.g., using a hash algorithm, such as MD5 or another hash algorithm), and the hash values of multiple allocated blocks of the memory can be compared to determine whether or not such match (e.g., based on a threshold comparison, such as determining that at least a certain percentage of the allocated blocks of memory match based on the comparison), thereby indicating heap spraying behavior, such as discussed above. In some cases, a subset of such allocated blocks is used for the hash calculation, such as also discussed above. In some cases, multiple hash calculations are performed using different subset selections of such allocated blocks (e.g., to detect heap spraying in which a first portion of allocated blocks may be written with NOPs (no operation instructions on the target architecture) by the program attempting to spray the heap), such as also discussed above. In some cases, the second stage of analysis performs such analysis using a sliding window analysis approach as discussed above (e.g., for allocated blocks within a predefined address range in the memory), in which the process of calculating hash values against each allocated block (e.g., or subset thereof) is performed for allocated blocks within the sliding window, and the hash value results of each these allocated blocks are compared (e.g., using a threshold comparison) to determine if heap spraying behavior is detected.

Thus, in this example, the second stage of analysis can be performed for only those allocated blocks in a heap of a memory that are within a predefined address range (e.g., and/or cover/span certain predefined addresses) as opposed to performing the second stage of analysis for every allocated block in a heap of a memory while monitoring execution of the malware sample in the virtual environment. As a result, this approach is more efficient and less costly to perform exploit detection based on heap spray detection.

In an example implementation, as similarly described above with respect to FIG. 1, the above-described security appliance and/or the above-described security cloud service can be implemented on a computer server with a Dual 6-Core Intel® Processor with Hyper-Threading, 128 GB RAM memory, and 120 GB SSD system disk. In an example implementation of the virtual environment for Microsoft Windows XP®, a computer server with a Dual 6-Core Intel® Processor with Hyper-Threading and 512 MB RAM memory can be used. In an example implementation of the virtual environment for Microsoft Windows 7®, a computer server with a Dual 6-Core Intel® Processor with Hyper-Threading and 1 GB RAM memory can be used. Various other hardware computing environments can be used for implementing the above-described virtual environment. As would now be apparent to one of ordinary skill in the art in view of the various embodiments disclosed herein, depending on the processor and memory of the computing environment, such techniques for heap allocation analysis can be slower or faster, and various time thresholds can be selected accordingly.

As an example use case scenario, a first stage of analysis of a malware sample (e.g., an unknown sample), such as a PDF file, can be monitored in the above-described virtual environment(s) to detect a potential heap spray attack if a burst allocation (e.g., more than 50 MB is allocated (or the total heap allocation exceeds the average of benign files with the same file format of the malware sample) within a predefined period of time, such as 500 ms or some other time period) is detected within a predefined address range of the memory (e.g., starting from high address 0x08080808 (~130 MB), an address range of 0x09090909 to 0x23232323 can cover most of the heap-spray cases without significant false positives). In particular, if such a burst allocation is detected using such heuristic techniques performed during this first stage of analysis, then the second stage of analysis for heuristic heap spray detection can be performed for allocated blocks within the predefined address range (e.g., and/or for heap allocations that cover predefined predictable addresses, which can include addresses observed to be targeted by malware using heap spray attacks). In an example implementation, during the second stage of analysis, if there are a number of consecutive predicable addresses (e.g., such as five consecutive targeted addresses or some other number of targeted addresses) covered by allocated blocks in the memory, in which such allocated blocks have the same size (e.g., greater than 16 k or some other allocated block size) and such allocated blocks are determined to have the same content (e.g., identical or a threshold match), then such behavior can be determined to be heap spraying.

In some cases, a sliding window analysis approach can also be implemented as described herein. For example, once a potential heap spray has been detected using the various techniques described herein, whether a malware sample is performing a heap spraying behavior can be verified using a sliding window analysis as follows: calculate a hash of each of a first set of allocated blocks in the heap of the memory that are in a predefined address range of the memory (e.g., the first five allocated blocks in the heap that are in the predefined address range of the memory can be selected, or some other number of allocated blocks can be selected); compare the hash of each of the first set of allocated blocks; and if the comparing of the hash of each of the first set of allocated blocks does not indicate that contents of each of the first set of allocated blocks satisfies a threshold match (e.g., that the content of each of the allocated blocks is identical or within some threshold match), then select a next set of blocks in the heap of the memory that are in the predefined address range in the memory (e.g., a second five blocks in the heap that are in the predefined address range in the memory can be selected, or some other number of blocks can be selected, such as from lower address range to higher address range in the memory) to repeat a sliding window analysis for detecting heap spraying behavior.

In one embodiment, the above-described techniques for detecting heap spraying can be combined with various other techniques for verifying whether the malware sample is performing malicious heap spraying (e.g., to reduce false positives), such as by using a file format static analyzer or any other filter/detection mechanism that can be used to reduce false positives and increase the detection rate. As will now be apparent to those of ordinary skill in the art in view of the various embodiments described herein, this approach is effective at detecting unknown heap spray attacks without generating false positives and can be performed by monitoring the heap in real-time (e.g., without any emulation).

Figure 5:
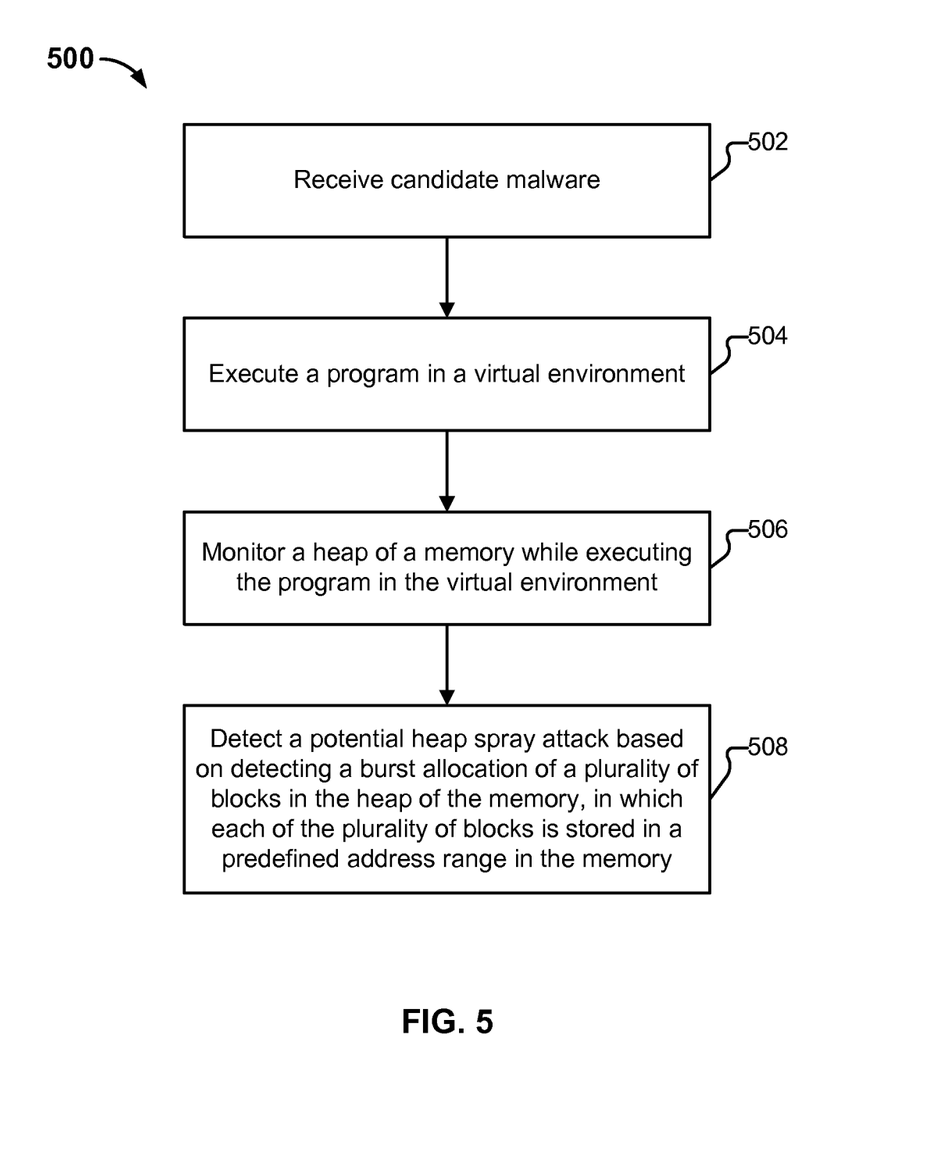
FIG. 5 is a flow diagram of a process for detecting a potential heap spray attack in accordance with some embodiments.

FIG. 5 is a flow diagram of a process for detecting a potential heap spray attack in accordance with some embodiments. In various embodiments, process 500 is performed by malware analysis system 132. The process begins at 502 when candidate malware (e.g., a malware sample) is received. As one example, candidate malware is received at 502 when an email (e.g., including an attachment) is received by data appliance 102 from system 120. As another example, data appliance 102 can be configured to transmit the attachment to service 122 for analysis. In that scenario, the candidate malware is received by cloud security service 122 at 502.

At 504, executing a program in a virtual environment is performed. For example, the candidate malware (e.g., malware sample) can be an executable (e.g., a program) or can be a file that is loaded using an executable based on file type, such as by executing an application that can load the malware sample (e.g., Adobe Acrobat® can be used to load a PDF file (.pdf), Microsoft Word® can be used to load a Word document (.doc), etc.).

At 506, monitoring a heap of a memory while executing the program in the virtual environment is performed. For example, such monitoring can be targeted to monitoring for allocations that are within a predefined address range or span one or more predefined addresses in the memory.

At 508, a potential heap spray attack is detected based on detecting a burst allocation of a plurality of blocks in the heap of the memory, in which each of the plurality of blocks is stored in the predefined address range of the memory. In an example implementation, the burst allocation can be determined based on additional qualifying criteria that can be used with this heuristic approach for detecting a potential heap spray attack, such as a number of heap allocations that exceed a threshold number (e.g., five or more heap allocations) and/or whether a threshold number of heap allocations was performed within a predetermined period of time. In another example implementation, whether the burst allocation exceeds a threshold size (e.g., the total allocation and/or the size of each allocated block) can also be used as criteria to determine whether such qualifies as a burst allocation that can also be used with this heuristic approach for detecting a potential heap spray attack. In yet another example implementation, whether each of the blocks in the burst allocation is of an identical size can also be used with this heuristic approach for detecting a potential heap spray attack.

Figure 6:
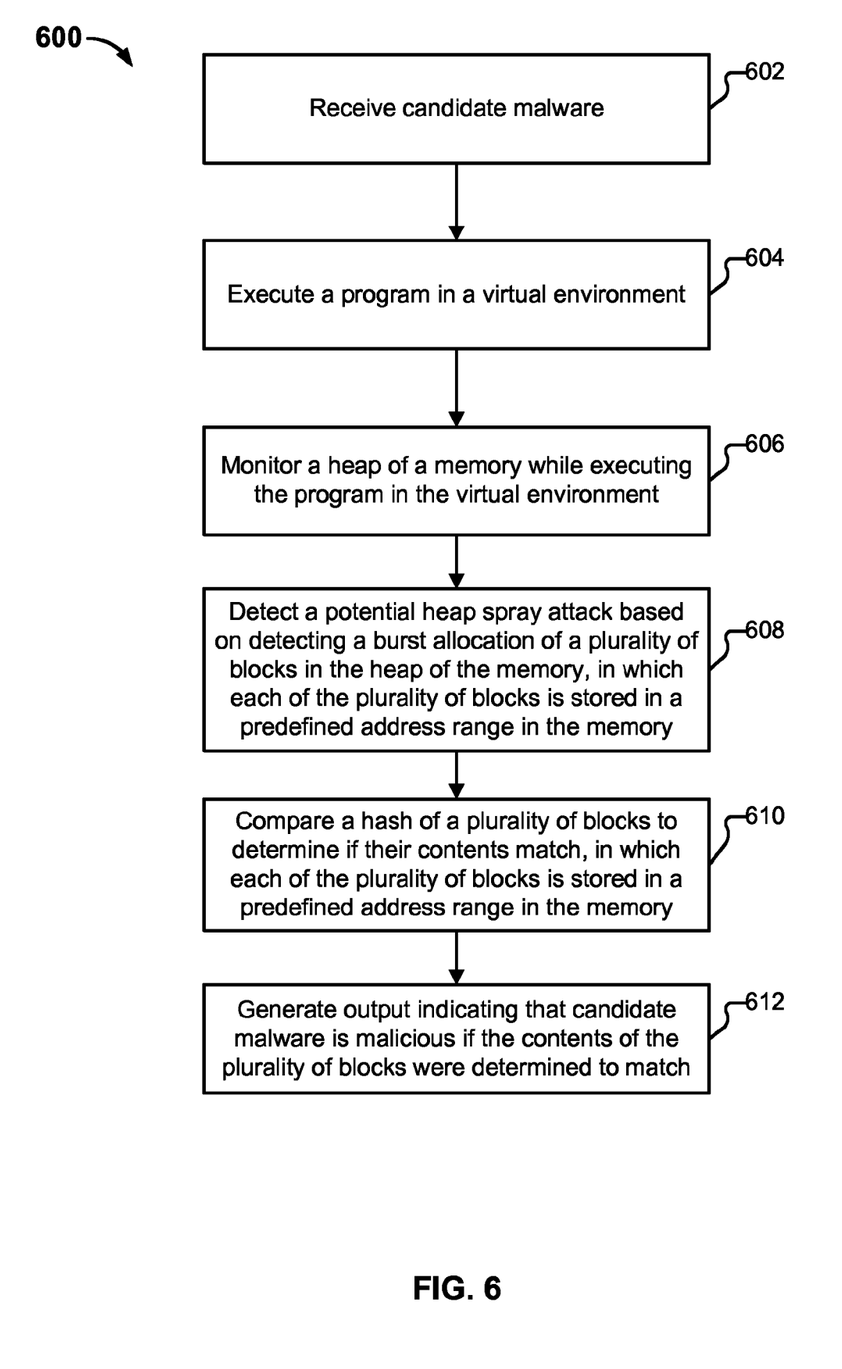
FIG. 6 is another flow diagram of a process for providing exploit detection based on heap spray detection in accordance with some embodiments.

FIG. 6 is another flow diagram of a process for providing exploit detection based on heap spray detection in accordance with some embodiments.

In various embodiments, process 600 is performed by malware analysis system 132. The process begins at 602 when candidate malware (e.g., a malware sample) is received. As one example, candidate malware is received at 602 when an email (e.g., including an attachment) is received by data appliance 102 from system 120. As another example, data appliance 102 can be configured to transmit the attachment to service 122 for analysis. In that scenario, the candidate malware is received by cloud security service 122 at 602.

A first stage of analysis is performed to determine if/when the candidate malware sample performs a potential heap spray attack. At 604, executing a program in a virtual environment is performed. For example, the candidate malware (e.g., malware sample) can be an executable (e.g., a program) or can be a file that is loaded using an executable based on file type, such as by executing an application that can load the malware sample (e.g., Adobe Acrobat® can be used to load a PDF file (.pdf), Microsoft Word® can be used to load a Word document (.doc), etc.). At 606, monitoring a heap of a memory while executing the program in the virtual environment is performed. For example, such monitoring can be targeted to monitoring for allocations that are within a predefined address range or span one or more predefined addresses in the memory. At 608, a potential heap spray attack is detected based on detecting a burst allocation of a plurality of blocks in the heap of the memory, in which each of the plurality of blocks is stored in the predefined address range of the memory. Various example implementations of additional criteria that can be used with this heuristic approach for detecting a potential heap spray attack are discussed above, such as discussed above with respect to 508 of FIG. 5.

At this point, the above-described first stage of analysis has efficiently determined that the candidate malware sample is performing a potential heap spray attack (e.g., using the lightweight techniques discussed above), so that a second stage of analysis can now be performed for verifying whether the candidate malware sample is performing heap spraying behavior. At 610, comparing a plurality of allocated blocks stored in a predefined address range in the memory is performed to determine if their contents match (e.g., the contents of each of these allocated blocks is identical or within a threshold match) in order to determine whether the candidate malware is performing heap spraying behavior. Various example implementations for determining whether the candidate malware sample is performing a heap spraying behavior can include performing the above-described heuristic heap spray detection techniques (e.g., comparing hashes of each of the allocated blocks, etc.), such as described above in more detail with respect to 304 of FIG. 3. At 612, if the contents of the plurality of blocks were determined to match, then output is generated that indicates that the candidate malware is malicious. As one example, a signature for the attachment can also be generated (e.g., as an MD5 hash-based signature). As another example, instead of or in addition to generating a signature, an alert can be generated that instructs data appliance 102 not to provide the attachment to client 104.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for exploit detection by detecting heap spray in memory, comprising:
a processor configured to:
execute a program in a virtual environment;
monitor a heap of the memory while executing the program in the virtual environment; and
perform a first stage of analysis while monitoring the heap of the memory while executing the program in the virtual environment, the first stage of analysis comprising:
detect a potential heap spray attack based on detecting a burst allocation of a first plurality of blocks in the heap of the memory; and
determine whether each of the first plurality of blocks is stored in a predefined address range of the memory;
in the event that during the first stage of analysis (1) the burst allocation of the first plurality of blocks is detected, and (2) each of the first plurality of blocks is stored in the predefined address range of the memory, then perform a second stage of analysis, the second stage of analysis comprising:
perform a comparison of each of a second plurality of blocks allocated in the heap of the memory, wherein each of the second plurality of blocks is stored in the predefined address range of the memory; and
detect a heap spray in memory based on the comparison of each of the second plurality of blocks allocated in the heap of the memory; and
a computer data storage coupled to the processor and configured to provide the processor with instructions.

2. The system recited in claim 1, wherein the second stage of analysis is performed only if the potential heap spray is determined during the first stage of analysis based on the detection of the burst allocation of the first plurality of blocks in the heap of the memory, wherein each of the first plurality of blocks is stored in the predefined address range of the memory.

3. The system recited in claim 1, wherein the first plurality of blocks span one or more predefined address ranges of the memory.

4. The system recited in claim 1, wherein the second plurality of blocks is a subset of the first plurality of blocks.

5. The system recited in claim 1, wherein each of the second plurality of blocks is distinct from each of the first plurality of blocks.

6. The system recited in claim 1, wherein the second plurality of blocks includes one or more of the first plurality of blocks.

7. The system recited in claim 1, wherein the first plurality of blocks exceeds a threshold size, and wherein the burst allocation of the first plurality of blocks in the heap of the memory is detected within a predetermined period of time.

8. The system recited in claim 1, wherein the first plurality of blocks exceeds a threshold number of blocks, and wherein the burst allocation of the first plurality of blocks in the heap of the memory is detected within a predetermined period of time.

9. The system recited in claim 1, wherein each of the first plurality of blocks is of at least a threshold block size.

10. The system recited in claim 1, wherein an allocated block size of each of the first plurality of blocks is identical, and wherein each of the first plurality of blocks is of at least a threshold block size.

11. The system recited in claim 1, wherein the comparison of each of the second plurality of blocks allocated in the heap of the memory comprises performing a threshold comparison of each of a second plurality of blocks allocated in the heap of the memory.

12. The system recited in claim 1, wherein the heap spray in memory is determined to be malicious based on the comparison of each of the second plurality of blocks allocated in the heap of the memory.

13. The system recited in claim 1, wherein the predefined address range of the memory is selected based on based on a file type being opened with the program or executable type of the program.

14. The system recited in claim 1, wherein the first stage of analysis further comprises:
determine whether the first plurality of blocks in the heap of the memory exceeds a threshold size within a predetermined period of time.

15. The system recited in claim 1, wherein the first stage of analysis further comprises:
determine whether the first plurality of blocks in the heap of the memory exceeds a threshold number of blocks within a predetermined period of time.

16. The system recited in claim 1, wherein the first stage of analysis further comprises:
determine whether each of the first plurality of blocks in the heap of the memory is identical.

17. The system recited in claim 1, wherein the first stage of analysis further comprises:
determine whether (1) each of the first plurality of blocks in the heap of the memory is identical, and (2) each of the first plurality of blocks is of at least a threshold block size.

18. The system recited in claim 1, wherein the second stage of analysis further comprises:
calculate a hash of each of the second plurality of blocks allocated in the heap of the memory; and
detect the heap spray in memory based on the calculated hashes.

19. The system recited in claim 1, wherein the second stage of analysis further comprises:
calculate a plurality of hashes of each of the second plurality of blocks allocated in the heap of the memory, wherein the plurality of calculated hashes are performed using distinct subset selections of each of the second plurality of blocks allocated in the heap of the memory; and
detect the heap spray in memory based on the plurality of calculated hashes.

20. The system recited in claim 1, wherein the second stage of analysis further comprises:
calculate a hash of each of the second plurality of blocks allocated in the heap of the memory;
compare the hash of each of the second plurality of blocks; and
if the compare of the hash of each of the second plurality of blocks does not indicate that contents of each of the second plurality of blocks satisfies a threshold match, then select a third plurality of blocks in the heap of the memory to repeat a sliding window analysis for detecting heap spraying behavior, wherein each of the third plurality of blocks is stored in the predefined address range of the memory.

21. The system recited in claim 1, wherein the system includes a cloud security service, and wherein the processor is further configured to:
receive a malware sample at the cloud security service from a security device, wherein the malware sample comprises (1) a file that can be monitored using the program selected based on a file type associated with the file or (2) an executable file that corresponds to the program, wherein the malware sample is monitored during execution in the virtual environment to determine whether the malware sample indicates potentially malicious heap spray related behavior.

22. A method for exploit detection by detecting heap spray in memory, comprising:
executing a program in a virtual environment;
monitoring a heap of the memory while executing the program in the virtual environment;
performing a first stage of analysis while monitoring the heap of the memory while executing the program in the virtual environment, the first stage of analysis comprising:
  detecting a potential heap spray attack based on detecting a burst allocation of a first plurality of blocks in the heap of the memory; and
  determining whether each of the first plurality of blocks is stored in a predefined address range of the memory;
in the event that during the first stage of analysis (1) the burst allocation of the first plurality of blocks is detected, and (2) each of the first plurality of blocks is stored in the predefined address range of the memory, then performing a second stage of analysis, the second stage of analysis comprising:
  performing a comparison of each of a second plurality of blocks allocated in the heap of the memory, wherein each of the second plurality of blocks is stored in the predefined address range of the memory; and
detecting a heap spray in memory based on the comparison of each of the second plurality of blocks allocated in the heap of the memory.

23. The method of claim 22, wherein the second stage of analysis is performed only if the potential heap spray is determined during the first stage of analysis based on the detection of the burst allocation of the first plurality of blocks in the heap of the memory, wherein each of the first plurality of blocks is stored in the predefined address range of the memory.

24. The method of claim 22, wherein the first plurality of blocks span one or more predefined address ranges of the memory.

25. The method of claim 22, wherein the second plurality of blocks is a subset of the first plurality of blocks.

26. The method of claim 22, wherein each of the second plurality of blocks is distinct from each of the first plurality of blocks.

27. The method of claim 22, wherein the second plurality of blocks includes one or more of the first plurality of blocks.

28. The method of claim 22, wherein the first plurality of blocks exceeds a threshold size, and wherein the burst allocation of the first plurality of blocks in the heap of the memory is detected within a predetermined period of time.

29. The method of claim 22, wherein the first plurality of blocks exceeds a threshold number of blocks, and wherein the burst allocation of the first plurality of blocks in the heap of the memory is detected within a predetermined period of time.

30. The method of claim 22, wherein each of the first plurality of blocks is of at least a threshold block size.

31. The method of claim 22, wherein an allocated block size of each of the first plurality of blocks is identical, and wherein each of the first plurality of blocks is of at least a threshold block size.

32. The method of claim 22, wherein the comparison of each of the second plurality of blocks allocated in the heap of the memory comprises performing a threshold comparison of each of a second plurality of blocks allocated in the heap of the memory.

33. The method of claim 22, wherein the heap spray in memory is determined to be malicious based on the comparison of each of the second plurality of blocks allocated in the heap of the memory.

34. The method of claim 22, wherein the predefined address range of the memory is selected based on based on a file type being opened with the program or executable type of the program.

35. The method of claim 22, wherein the first stage of analysis further comprises:
determining whether the first plurality of blocks in the heap of the memory exceeds a threshold size within a predetermined period of time.

36. The method of claim 22, wherein the first stage of analysis further comprises:
determining whether the first plurality of blocks in the heap of the memory exceeds a threshold number of blocks within a predetermined period of time.

37. The method of claim 22, wherein the first stage of analysis further comprises:
determining whether each of the first plurality of blocks in the heap of the memory is identical.

38. The method of claim 22, wherein the first stage of analysis further comprises:
determining whether (1) each of the first plurality of blocks in the heap of the memory is identical, and (2) each of the first plurality of blocks is of at least a threshold block size.

39. The method of claim 22, wherein the second stage of analysis further comprises:
calculating a hash of each of the second plurality of blocks allocated in the heap of the memory; and
detecting the heap spray in memory based on the calculated hashes.

40. The method of claim 22, wherein the second stage of analysis further comprises:
calculating a plurality of hashes of each of the second plurality of blocks allocated in the heap of the memory, wherein the plurality of calculated hashes are performed using distinct subset selections of each of the second plurality of blocks allocated in the heap of the memory; and
detecting the heap spray in memory based on the plurality of calculated hashes.

41. The method of claim 22, wherein the second stage of analysis further comprises:
calculating a hash of each of the second plurality of blocks allocated in the heap of the memory;
comparing the hash of each of the second plurality of blocks; and
if the comparing of the hash of each of the second plurality of blocks does not indicate that contents of each of the second plurality of blocks satisfies a threshold match, then selecting a third plurality of blocks in the heap of the memory to repeat a sliding window analysis for detecting heap spraying behavior, wherein each of the third plurality of blocks is stored in the predefined address range of the memory.

42. The method of claim 22, further comprising:
receiving a malware sample at a cloud security service from a security device, wherein the malware sample comprises (1) a file that can be monitored using the program selected based on a file type associated with the file or (2) an executable file that corresponds to the program, wherein the malware sample is monitored during execution in the virtual environment to determine whether the malware sample indicates potentially malicious heap spray related behavior.

* * * * *